Patented Oct. 28, 1941

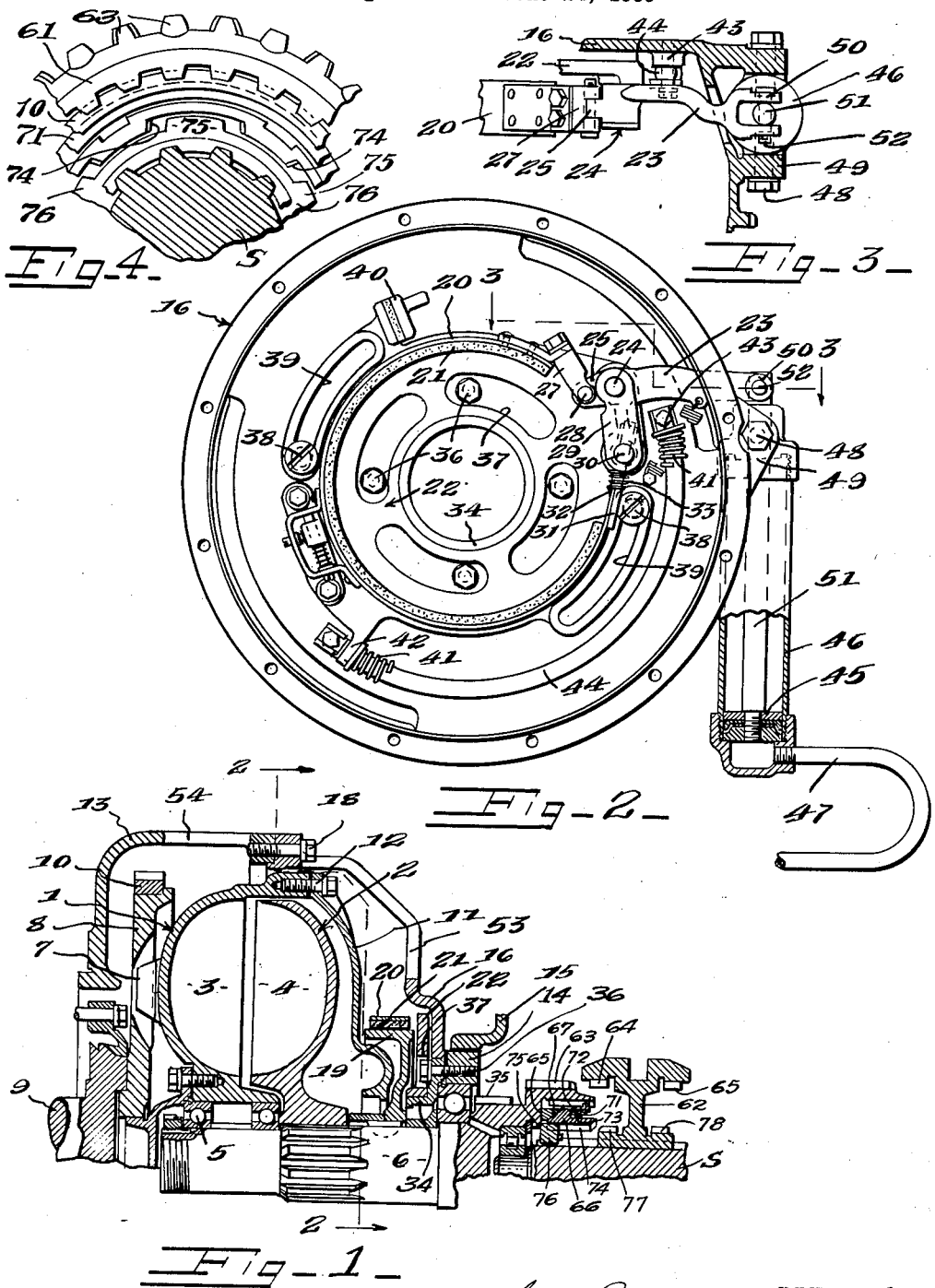

2,260,580

UNITED STATES PATENT OFFICE 2,260,580

BRAKE FOR TRANSMISSION MECHANISM INCLUDING A HYDRAULIC COUPLING

Carl D. Peterson and Albert H. Deimel, Toledo, Ohio

Original application June 24, 1939, Serial No. 281,014. Divided and this application April 11, 1940, Serial No. 329,160

1 Claim. (Cl. 192—3.2)

This invention relates to brakes for transmission mechanisms including a hydraulic coupling of the Fottinger type and a change speed transmission gearing including balking ring clutches, of the type shown in our pending application Serial No. 281,014, filed June 24, 1939, of which application this is a division, and has for its object a particularly simple and effective brake mechanism primarily operable to effect the crossing of the speeds by rocking the balking ring to unlocked position to permit the engagement of the toothed elements of the balking ring clutches in the transmission gearing, particularly when starting the vehicle from stand-still, when the driven section of the clutch is stationary or not rotating. It will be understood that in transmission gearings involving balking ring clutches, the clutches may be shifted into engaged position only when the speeds cross, the crossing of the speeds unlocking the balking ring and that in making a shift from a standing start with the engine running, the speeds can be crossed only by unlocking the balking ring by an outside force because with the engine running and the driven section of the clutch stationary or at zero speed, the balking ring is being dragged or held in locked position, and no amount of deceleration of the engine will move it to unlocked position.

The term "crossing of the speeds" or similar expression is used for brevity's sake. In the balking ring type of clutch, the crossing of the speeds is effected when the driving clutch member is accelerated to and beyond the speed of the driving clutch member, when both are rotating or the driven clutch member accelerated up to and beyond the speed of the driving clutch member, as when the vehicle is coasting, or decelerating the speed so that the driving member of the clutch decreases in speed to and beyond that of the driven clutch member, or when, as in this case the driven clutch member is stationary or at zero speed and the driving clutch member rotating, and the balking ring forcibly rotated against the dragging action of the driving clutch member to unlocked position. The forcible rotating of the balking ring is for convenience effected by stopping and reversing the driving clutch member by means of a rocking brake bringing about in practical effect the crossing of the speeds when a start is being made from stand-still.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional view of a transmission mechanism showing one embodiment of the brake, the contiguous portion of the front wall of the gear box of the change speed transmission gearing being also shown.

Figure 2 is a sectional view taken on the plane of line 2—2, Figure 1, parts as the brake drum and the runner shaft being omitted.

Figure 3 is a fragmentary sectional view on line 3—3, Figure 2.

Fig. 4 is a fragmentary detail view of one form of balking ring type of clutch embodied in the transmission mechanism, the section being taken substantially on the line 4—4 of Fig. 2.

1 designates the impeller and 2 the runner of a hydraulic coupling of the Fottinger type, these being opposed to each other and having radial vanes 3, 4. The impeller 1 has a bearing at 5 on the coupling shaft 6 which is, in this embodiment of the invention, the shaft of the stem gear of a transmission gearing. The impeller 1 is here shown as interlocked, as by lugs 7, with a flywheel 8 rotatable with the drive shaft 9, as the crank shaft of the engine of the vehicle, the wheel 8 being provided with a ring gear 10 for coacting with the starter pinion not shown. The impeller 1 has a casing portion 11 secured thereto as by screws 12, which casing portion encloses the runner. The runner 2 is splined on the shaft 6.

13 designates the housing for the coupling, this being secured in any well known manner to the crank case of the engine. 14 is the front wall of the gear box and 15 the usual cover for the gear box. 16 is a housing analogous to a bell housing secured to the front wall of the gear box and at its outer rim to the housing 13, as by screws 18.

The brake for effecting the crossing of the speeds comprises a brake drum 19 mounted on the shaft 6 in the rear of the casing or wall 11 and a brake band 20 having a lining 21 for coacting with the brake drum 19, and operating means for the brake band for successively contracting the band on the brake drum to stop the shaft 6 and then rotating the shaft in a retrograde direction to cross the speeds of driving and driven cluch members embodied in the change speed gearing in the gear box. This operating means comprises a carrier 22 in the general form of a disk or flat ring mounted concentric with the shaft 6 between the brake drum 19 and the gear box, an operating lever 23 pivoted at 24 to the carrier 22 between its ends but near one end providing a short arm 25, means connecting one end of the brake band and the short arm 25 of the lever, and means connecting the other end of the brake band and the carrier.

As here illustrated, one end of the brake band 19 is connected to the short arm 25 of the lever by a link 27 pivoted at 28 to the short arm of the lever and the other end of the brake band is connected by a link or shoulder 29 pivoted at 30 at one end to the brake band and at its other end on the pivot 24. This link 29 is bifurcated or is a shackle extending astride the lever 23. The pivot 30 is located between the sides of the shackle or double link 29 and is formed with a dimetrical bore, through which a rod or stem 31 extends, this having a head 32 at one end which thrust against the pivot 30 around the diametrical bore. The stem or rod 31 is suitably secured to the brake band, and a spring 33 for taking up looseness or rattle encircles the rod and thrusts at one end against the pivot 30 and at its other end against the end edge of the brake band.

In the illustrated assembly of the brake, on the input shaft of the gearing, where the input shaft is the stem of a stem gear, the carrier 22 is located between the brake drum and the front wall of the gear box.

As here shown, the ring is mounted to rotate about a hub on a cap 34 for the gearing 35 on the shaft 6 in the front wall of the gear box and is capable of a rocking movement about the hub. The cap 34 is secured to the front wall of the gear box, as by screws 36, extending through arcuate slots 37 in the carrier 22, these being long enough to permit the required rocking movement of the carrier. The carrier is secured to the bell housing 16, as the bell housing laps the front wall of the gear box, as by screws 38 extending through arcuate slots 39 provided in the rim of the carrier and long enough to permit the required rocking movement of the carrier. A suitable stop or lug 40 is provided on the inner face of the bell housing 16 to determine the starting position of the carrier 22. The rocking of the carrier by the brake is against the action of a returning spring 41 arranged in an arc concentric with the axis of the shaft 6, this being a compression spring thrusting at one end against a radial lug 42 on the carrier and its other end against the lug 43 provided on the inner face of the bell housing. The spring 41 is coiled about an arcuate rod 44 fixed to the lug 43 and slidable in the radial lug or shoulder 42 on the carrier.

The lever 23 may be actuated in any suitable manner. It is here shown as power actuated, as by a piston 45 movable in the cylinder 46 to which a motive fluid, as air, may be supplied through a flexible conduit 47, the conduit being provided with a control valve, not shown. The cylinder 46 is mounted to oscillate during the movement of the lever 23 and is here shown as pivoted at 48 in a bracket 49 provided on the bell housing 16. The outer end of the lever 23 is bifurcated at 50 and arranged astride the end of the piston rod 51 and pivoted thereto at 52. The bell housing 16 and coupling housing 13 are provided with suitable ventilating openings 53 and 54 respectively.

One construction of balking ring clutch is shown in Figures 1 and 4. 61 designates the driving toothed member which is rotatable with the runner shaft 6 and usually formed integral with the gear 35 thereon; 62 is the driven clutch member, the clutch members having teeth or jaws 63, 64 respectively operable into interlocking or clutching engagement by axial shifting of one of the clutch members, here shown as the driven clutch member 62. The driven clutch member 62 is shown as splined on and shiftable axially of the output shaft S of the transmission gearing. It is shown as a double clutch shiftable in opposite directions from neutral to effect direct drive and indirect drive in the well known manner. Being of double construction, the clutch member 62 is provided on one side with the teeth 64 and on the other side with a similar set of clutch teeth 65.

66 designates the balking ring having a friction face, as a conical face 67, coacting with a complemental conical face on a ring 68 interlocked, as by splines 69, with the driving clutch member 61 so as to rotate therewith. The conical face of the balking ring is engaged with little friction with the complemental face of the ring 68, so as to drag on the ring 68 in order to rock the balking ring or move it circumferentially, within limits, into and out of locking or blocking position. The balking ring is held assembled with the clutch 61 in any suitable manner by a lock ring 70 and rings 71, 72 and 73 interposed between the lock ring and the balking ring. The rings 71, 72 are interlocked with the clutch member 61 to rotate therewith and the ring 73 is interposed between the rings 71 and 72 and interlocked with the balking ring 66. These rings serve to initially thrust the balking ring 66 into light frictional engagement with the ring 68 to cause the balking ring to drag on the ring 68 and hence to rock into locking and unlocking positions. One of these rings, as 73, may be in the nature of a spring or wave washer to urge the balking ring axially. The rings are located in an annular peripheral recess in the balking ring 66.

The balking ring is formed with internal recesses 74 which receive radial projections 75 on a ring 76 splined to the output shaft S, the projections 75 being of less width than the recesses 74 to permit the rocking or rotary movement, within limits, of the ring 66 relatively to the ring 76 and the output shaft S. The driven clutch member 62 is provided with radial projections 77. There are corresponding projections 78 on the opposite side of the clutch member 62, as the clutch is a double one. These projections are the same width as the recesses 74 in the balking ring and are free to pass through the recesses 74 when alined therewith, in order to permit shifting of the clutch section 62 to carry the clutch teeth 64 thereof into interlocking engagement with the clutch teeth 63 of the driving clutch section 61, but to block or balk such shifting when the balking ring is rocked to carry the recesses 74 out of alinement with the teeth 77, so that the ends of the teeth 77 engage on the ring or one side or the other, in a circumferential direction, of the recesses 74 when the driving and driven clutch members are rotating at different speeds, this being due to the drag of the balking ring under light pressure on the friction face of the ring 68. When, however, the speeds cross, the same drag moves the recesses 74 into alinement with the teeth 77 so that with continued shifting pressure being applied, the teeth 77 pass through the recesses and bring the clutch teeth 64 into interlocking engagement with the clutch teeth 63. When starting the vehicle from a standing-start, the balking ring 66, due to the drag, will be rocked to locking position, wherein the recesses 74 are out of alinement with the projections 75. In order to bring the recesses 74 into alinement with the projections 75, the brake is operated to rock the balking ring 66. The movement of the brake is transferred to the balking ring through the runner shaft 6, as the brake acts on the runner shaft 6 and incidentally rocks the runner 2 of the hydraulic coupling in a retrograde direction.

In the operation of the brake, when the lever 23 is actuated, it first moves upwardly about its pivot 24 contracting the brake band 19 on the brake drum 19 and applying a braking force until the shaft is stopped, whereupon the lever, under its actuating force, moves further upwardly with no pivotal movement about the pivot 24, thereby rocking the carrier 22, which in turn rocks the shaft 6 for the purpose of effecting the crossing of the speeds of the driving and driven members of a selected balking ring clutch in the gear box 14. By reason of the brake drum and carrier, the brake and operating mechanism therefor can be located in a particularly small axial space, and by reason of the lever 23, links 27 and 29, the successive application of the brake to stop the shaft and the rocking of the carrier to rock the shaft is effected by a particular simple mechanism embodying a few compactly arranged parts.

What we claim is:

In a transmission mechanism, the combination of a hydraulic coupling including an impeller and a runner element, a change speed transmission gearing including input and output shafts and a balking ring clutch including driving and driven sections, one of which is shiftable axially and a balking ring rotatable with one of said sections and also having a rotary rocking movement relatively thereto into and out of balking or locking position under frictional engagement with the other section, when the speeds of the sections are differential, preliminary to clutch engagement, and driver operated brake means operable to rock the balking ring from locking to unlocking position.

CARL D. PETERSON.
ALBERT H. DEIMEL.